US008620613B2

(12) United States Patent
Segawa et al.

(10) Patent No.: US 8,620,613 B2

(45) Date of Patent: Dec. 31, 2013

(54) SENSOR DIAGNOSTIC APPARATUS AND METHOD THEREOF

(75) Inventors: Eigo Segawa, Kawasaki (JP); Morito Shiohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 12/338,282

(22) Filed: Dec. 18, 2008

(65) Prior Publication Data

US 2009/0164164 A1 Jun. 25, 2009

(30) Foreign Application Priority Data

Dec. 25, 2007 (JP) ................................ 2007-331944

(51) Int. Cl.
*G01D 1/00* (2006.01)

(52) U.S. Cl.
USPC .......................................................... 702/128

(58) Field of Classification Search
USPC .................................................. 702/116, 128
See application file for complete search history.

(56) References Cited

U.S. PATENT DOCUMENTS

| | | | | |
|---|---|---|---|---|
| 5,257,194 A * | 10/1993 | Sakita | 701/117 |
| 7,706,965 B2 * | 4/2010 | Downs et al. | 701/117 |
| 2007/0208493 A1 * | 9/2007 | Downs et al. | 701/117 |
| 2007/0208494 A1 * | 9/2007 | Chapman et al. | 701/117 |

FOREIGN PATENT DOCUMENTS

| | | |
|---|---|---|
| DE | 10 2004 009 898 | 9/2005 |
| DE | 10 2004 009 898 A1 | 9/2005 |
| DE | 10 2005 032 972 A1 | 1/2007 |
| FR | 2 721 717 A | 12/1995 |
| GB | 2 377 027 A | 12/2002 |
| JP | 11-110684 | 4/1999 |
| JP | 2006-244338 | 9/2006 |
| WO | 2007/103180 | 9/2007 |

OTHER PUBLICATIONS

European Search Report dated Mar. 30, 2009 and issued in corresponding European Patent Application 08171967.6.

Chinese Office Action issued Aug. 4, 2010 in corresponding Chinese Patent Application 200810185294.4.

European Search Report for corresponding European Application 08 171 967.6-2211; Apr. 6, 2010.

European Office Action for corresponding European Application 08 171 967.6-2211; dated Feb. 7, 2011.

* cited by examiner

*Primary Examiner* — Aditya Bhat

(74) *Attorney, Agent, or Firm* — Staas & Halsey LLP

(57) ABSTRACT

A sensor diagnostic apparatus for diagnosing a sensor includes a moving object counter, a reference value storage, and a comparator. The moving object counter counts, in accordance with identification data acquired by a plurality of sensors in a predefined time period, a local number of moving objects moving between a sensing area of a first sensor and a sensing area of a second sensor near the first sensor. The reference value storage stores a preset reference value for the first sensor and the second sensor. The comparator compares a value derived from the local number of moving objects counted by the moving object counter with the preset reference value stored in the reference value storage to determine the first sensor to be in trouble when a difference between the value derived from the local number of moving objects and the preset reference value exceeds a predefined threshold value.

12 Claims, 16 Drawing Sheets

| SENSOR ID: 1 | | | SENSOR ID: 2 | | | SENSOR ID: 3 | |
|---|---|---|---|---|---|---|---|
| TIME | ID | | TIME | ID | | TIME | ID |
| 12:00:00 | 0001 | | 12:00:10 | 0001 | | 12:00:00 | 0101 |
| 12:01:10 | 0200 | | 12:01:00 | 5000 | | 12:03:00 | 0200 |
| 12:02:00 | 0033 | | 12:02:00 | 0200 | | 12:03:30 | 0033 |
| ... | ... | | ... | ... | | ... | ... |

Fig. 5

| SENSOR ID | ADJACENT SENSOR IDs | |
|---|---|---|
| 1 | 2 | |
| 2 | 1 | 3 |
| 3 | 2 | 4 |
| ... | ... | ... |
| n | n-1 | |

| | | FOLLOWING SENSOR ID | | | | |
|---|---|---|---|---|---|---|
| | | 1 | 2 | 3 | ... | n |
| PRECEDING SENSOR ID | 1 | | S12 | S13 | | S1n |
| | 2 | S21 | | S23 | | S2n |
| | 3 | S31 | S32 | | | S3n |
| | ... | | | | | |
| | n | Sn1 | Sn2 | Sn3 | | |

Fig. 8

| | | FOLLOWING SENSOR ID | | | | |
|---|---|---|---|---|---|---|
| | | 1 | 2 | 3 | ... | n |
| PRECEDING SENSOR ID | 1 | | T12 | T13 | | T1n |
| | 2 | T21 | | T23 | | T2n |
| | 3 | T31 | T32 | | | T3n |
| | ... | | | | | |
| | n | Tn1 | Tn2 | Tn3 | | |

Fig. 9

| REFERENCE SENSOR ID | PRECEDING SENSOR ID | FOLLOWING SENSOR ID | RATIO | REFERENCE VALUE |
|---|---|---|---|---|
| 1 | 1 | 2 | T12 / N1 | S1_12 |
| | 2 | 1 | T21 / N1 | S1_21 |
| | 1 | 3 | T13 / N1 | S1_13 |
| | 3 | 1 | T31 / N1 | S1_31 |
| 2 | 2 | 1 | T21 / N2 | S2_21 |
| | 1 | 2 | T12 / N2 | S2_12 |
| | 2 | 3 | T23 / N2 | S2_23 |
| | 3 | 2 | T32 / N2 | S2_32 |
| 3 | 3 | 2 | T32 / N3 | S3_32 |
| | 2 | 3 | T23 / N3 | S3_23 |
| | 3 | 1 | T31 / N3 | S3_31 |
| | 1 | 3 | T13 / N3 | S3_13 |
| | 3 | 4 | T34 / N3 | S3_34 |
| | 4 | 3 | T43 / N3 | S3_43 |
| ... | ... | ... | ... | ... |
| n | n | n-1 | Tn(n-1) / Nn | Sn_nn-1 |
| | n-1 | n | T(n-1)n / Nn | Sn_n-1n |
| | n | n-2 | Tn(n-2) / Nn | Sn_nn-2 |
| | n-2 | n | T(n-2)n / Nn | Sn_n-2n |

Fig. 15

| REFERENCE VALUES ON CONDITION A | | FOLLOWING SENSOR ID | | | | |
|---|---|---|---|---|---|---|
| | | 1 | 2 | 3 | ... | n |
| PRECEDING SENSOR ID | 1 | | S12 | S13 | | S1n |
| | 2 | S21 | | S23 | | S2n |
| | 3 | S31 | S32 | | | S3n |
| | ... | | | | | |
| | n | Sn1 | Sn2 | Sn3 | | |

Fig. 16A

| REFERENCE VALUES ON CONDITION B | | FOLLOWING SENSOR ID | | | | |
|---|---|---|---|---|---|---|
| | | 1 | 2 | 3 | ... | n |
| PRECEDING SENSOR ID | 1 | | T12 | T13 | | T1n |
| | 2 | T21 | | T23 | | T2n |
| | 3 | T31 | T32 | | | T3n |
| | ... | | | | | |
| | n | Tn1 | Tn2 | Tn3 | | |

Fig. 16B

| | |
|---|---|
| CONDITION A | TIME: 8:00-17:00 |
| CONDITION B | TIME: 17:00-8:00 |

Fig. 17

| | |
|---|---|
| CONDITION A | PRECIPITATION: ≥5mm |
| CONDITION B | PRECIPITATION: <5mm |

Fig. 18

SENSOR DIAGNOSTIC APPARATUS AND METHOD THEREOF

BACKGROUND OF THE INVENTION

1. Field of the Invention

The present invention relates to a sensor diagnostic method and apparatus for diagnosing each sensor of a sensor system.

2. Description of the Related Art

Nowadays, data about an amount of time (a travel time) required to move from one place to another is provided on major roads as road information. Japanese Laid-open Patent Publication No. 11-110684 discusses a sensor system for acquiring such data regarding a travel time, for example.

In addition, Japanese Laid-open Patent Publication No. 2006-244338 discusses a sensor system for locating a specific product, for example.

As shown in FIG. 1, the sensor system for acquiring data about a travel time includes sensors (vehicle license plate readers) 1_a_, 1_b_, and 1_c_ allocated in a plurality of locations on the road, and a center apparatus 3 connected to the sensors 1_a_, 1_b_, and 1_c_ through a network 2 and gathering number data (read vehicle license number and read time) output from the sensors 1_a_, 1_b_, and 1_c_.

The center apparatus 3 determines a travel time of each section on the basis of number data sent from the sensors 1_a_, 1_b_, and 1_c_, by obtaining a difference between the shot times of the same vehicle license number at respective locations where the sensors 1_a_, 1_b_, and 1_c_ are allocated.

As shown in FIG. 2, the system for locating a specific product includes an RFID (radio frequency identification) tag 6 attached to a product 5 to be managed, sensors (RFID readers) 7_a_, 7_b_, and 7_c_ allocated in a plurality of locations within a roaming area of the product, and a center apparatus 9 connected to the sensors 7_a_, 7_b_, and 7_c_ through a network 8 and gathering ID data (read ID and read time) output from the sensors 7_a_, 7_b_, and 7_c_ through the network 8. The center apparatus 9 grasps a current location and roaming history of each product by obtaining read times of a product with the same ID at respective locations where the sensors 7_a_, 7_b_, and 7_c_ are allocated.

Conventional systems operate on the presumption that sensors operate normally as expected and identification data of a specific product within a predefined distance from a sensor can be surely acquired without any loss. However, in fact, a sensor may output wrong data or lose data due to aging, a change in installation environments, and the like.

For example, a vehicle license plate reader, which reads a vehicle license plate from a video image captured with a camera, may not correctly read a vehicle license plate if a camera lens gets fogged or soiled during operation. In this case, an output result may involve an error or loss.

In addition, an RFID reader may not correctly read an ID when some object shielding or reflecting a radio wave is allocated within a sensing area or a direction of an antenna is changed during operation. In this case, an output result may involve any loss.

As discussed above, an abnormal operation of a sensor during operation of a system causes an abnormal operation of the system. Thus, it is necessary to check whether each sensor operates normally in order to normally operate the system.

SUMMARY

One conceivable solution to this problem is to provide a self-diagnostic function for checking normal operations to each sensor, and get notification in case of trouble. The self-diagnostic function, however, may not be easily realized and may be expensive because all changes that would influence a sensor operation, including aging and environmental change, must be considered to detect a trouble.

Accordingly, it is an object of the present invention to provide a sensor diagnostic method and apparatus capable of checking normal operations of each sensor without providing a self-diagnostic function to each sensor.

According to an aspect of the present invention, provided is a sensor diagnostic apparatus for diagnosing a sensor among a plurality of sensors. Each of the plurality of sensors identifies an object and outputs acquired identification data. The sensor diagnostic apparatus includes a moving object counter, a reference value storage, and a comparator. The moving object counter counts, in accordance with identification data acquired by the plurality of sensors in a predefined time period, a local number of moving objects moving between a sensing area of a first sensor and a sensing area of a second sensor near the first sensor. The reference value storage stores a preset reference value for the first sensor and the second sensor. The comparator compares a value derived from the local number of moving objects counted by the moving object counter with the preset reference value stored in the reference value storage to determine the first sensor to be in trouble when a difference between the value derived from the local number of moving objects and the preset reference value exceeds a predefined threshold value.

Each of the plurality of sensors may output, as well as the identification data, data of an acquired time of the identification data. The moving object counter of the sensor diagnostic apparatus may count the local number of moving objects of which the identification data were acquired by the first sensor and the second sensor and the acquired times of the identification data indicate times within the predefined time period.

A dimension of the preset reference value may be identical to a dimension of the local number of moving objects. In such a configuration, the comparator compares the local number of moving objects, as the value derived from the local number of moving objects, with the preset reference value.

A dimension of the preset reference value may be identical to a dimension of a ratio of the local number of moving objects against a whole number of moving objects identified by the first sensor. In such a configuration, the comparator compares the ratio of the local number of moving objects against the whole number of moving objects identified by the first sensor, as the value derived from the local number of moving objects, with the preset reference value.

The reference value storage may store a plurality of preset reference values corresponding to different environmental conditions. In such a configuration, the comparator compares the value derived from the local number of moving objects with a preset reference value selected, in accordance with a current environmental condition, from among the plurality of preset reference values stored in the reference value storage.

The comparator may determine the first sensor to be normal when the difference between the value derived from the local number of moving objects and the preset reference value is less than or equals to the predefined threshold value. In such a configuration, the sensor diagnostic apparatus may further include an updater for updating the preset reference value for the first sensor and the second sensor in accordance with the local number of moving objects when the comparator has determined the first sensor to be normal.

According to another aspect of the present invention, provided is a sensor diagnostic method executed by a sensor diagnostic apparatus for diagnosing a sensor among a plurality of sensors. Each of the plurality of sensors identifies an object and outputs acquired identification data. The sensor diagnostic method includes: counting, in accordance with identification data acquired by the plurality of sensors in a predefined time period, a local number of moving objects moving between a sensing area of a first sensor and a sensing area of a second sensor near the first sensor, storing a preset reference value for the first sensor and the second sensor, and comparing a value derived from the local number of moving objects counted in the operation of counting a local number of moving objects with the preset reference value to determine the first sensor to be in trouble when a difference between the value derived from the local number of moving objects and the preset reference value exceeds a predefined threshold value.

BRIEF DESCRIPTION OF THE DRAWINGS

FIG. 5 is a diagram illustrating an example of data format of data stored in a sensor output storage part according to an embodiment of the present invention;

FIG. 8 is a diagram illustrating an example of data format of data stored in a reference value storage part according to an embodiment of the present invention;

FIG. 9 is a diagram illustrating an example of data format of a moving object number table according to an embodiment of the present invention;

FIG. 15 is a diagram illustrating an example of data format of data stored in a reference value storage part according to an embodiment of the present invention;

FIGS. 16A and 16B are diagrams illustrating examples of data format of data stored in a reference value storage part according to an embodiment of the present invention;

FIG. 17 is a diagram illustrating examples of environmental conditions according to an embodiment of the present invention;

FIG. 18 is a diagram illustrating examples of environmental conditions according to an embodiment of the present invention.

DESCRIPTION OF THE PREFERRED EMBODIMENTS

Hereinafter, embodiments of the present invention will be discussed with reference to the accompanying drawings.

In the following embodiments of the present invention, a trouble in a sensor is detected on the basis of the fact that a vehicle or other such objects moves following a fixed pattern.

For example, sensors allocated on one road detect in turn most of vehicles running on the road. Then, IDs of the vehicles detected by each of the plurality of sensors are compared to one another. If many IDs are matched, the sensors may normally operate. If only a few IDs are matched, the sensors may not normally operate. The sensors are diagnosed on the basis of such an idea.

Figure 1:
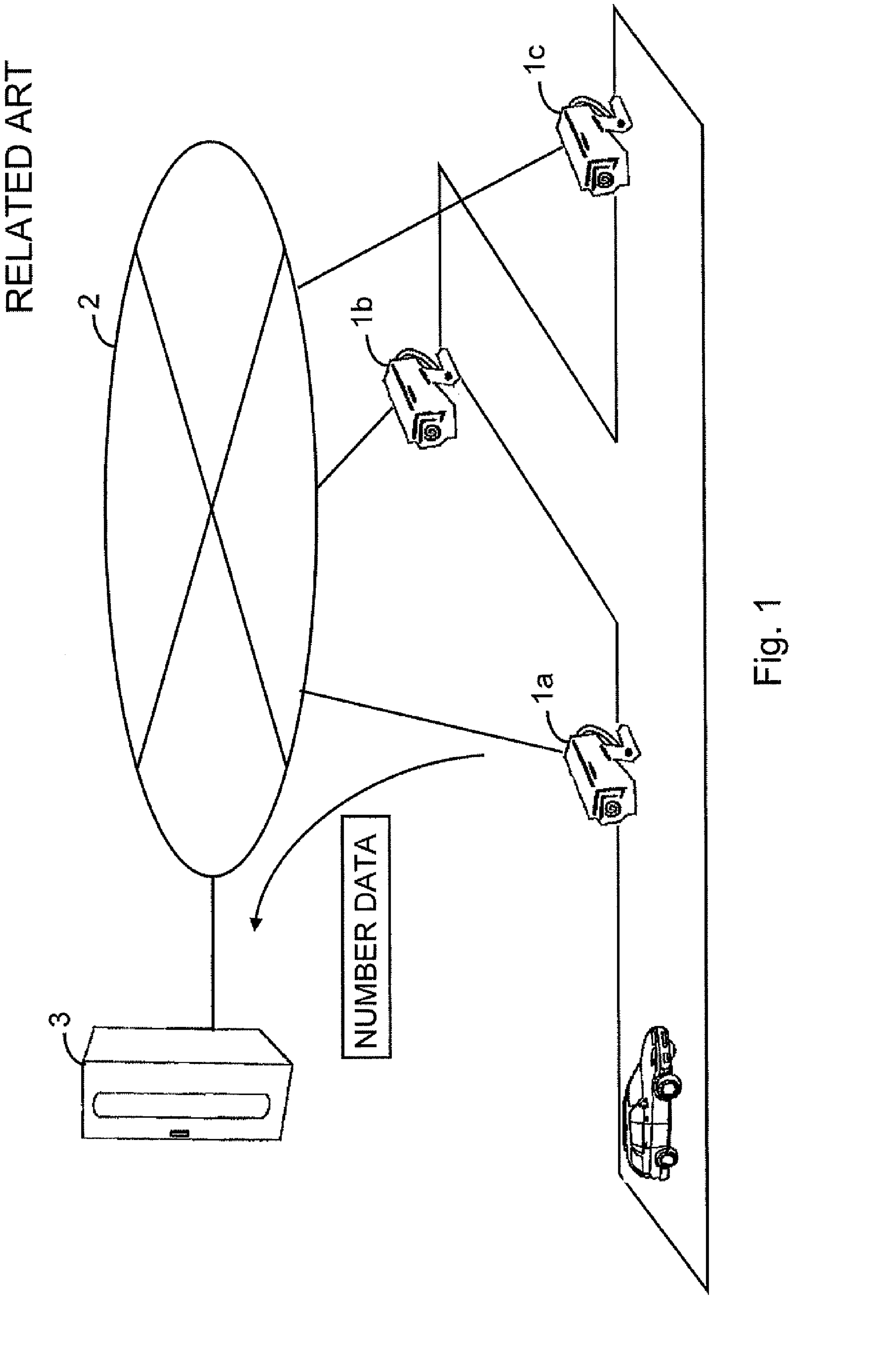
FIG. 1 is a diagram illustrating an example of conventional sensor systems.
Figure 2:
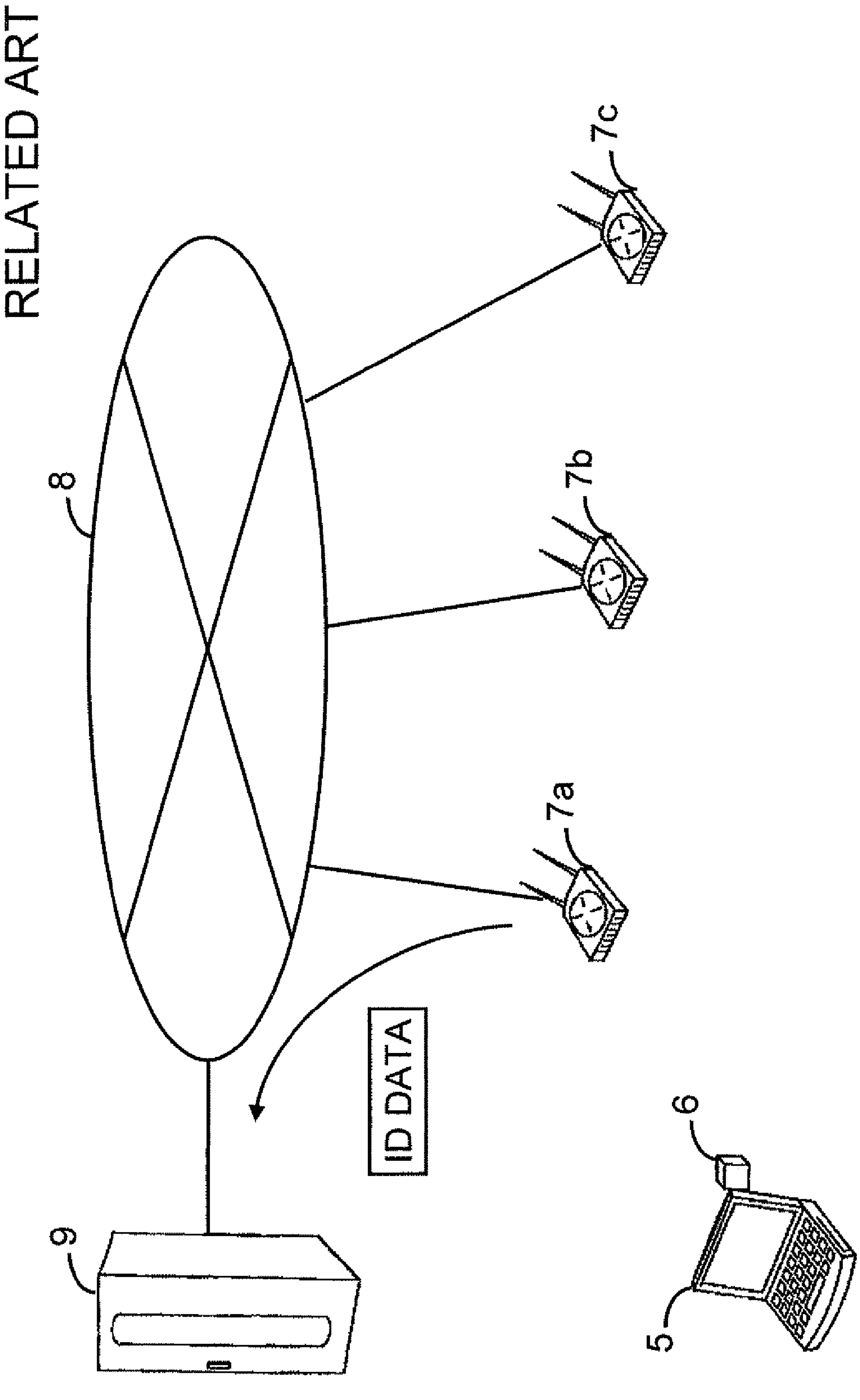
FIG. 2 is a diagram illustrating an example of conventional sensor systems.
Figure 3:
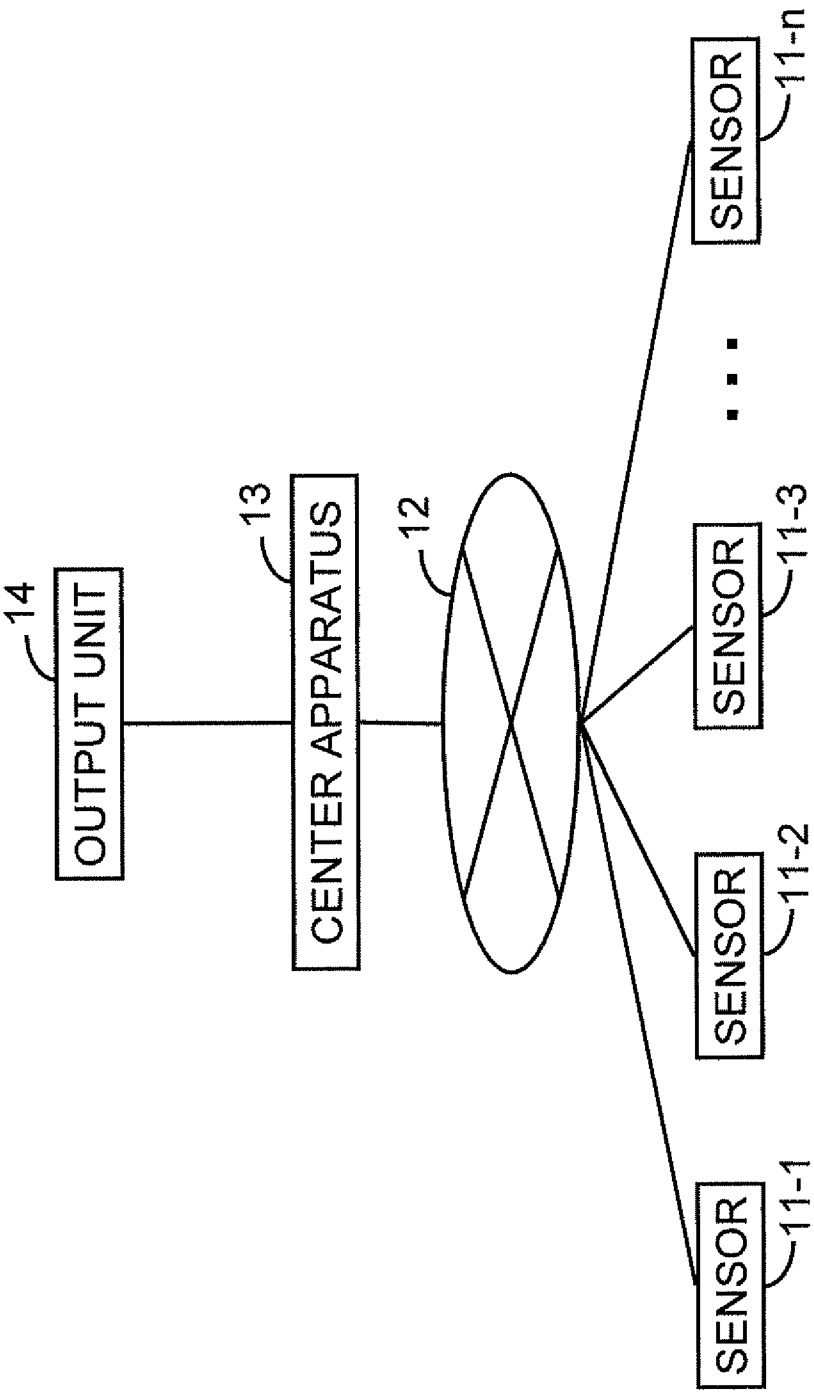
FIG. 3 is a diagram illustrating an example of an entire system configuration of a sensor system according to an embodiment of the present invention.

FIG. 3 is a diagram illustrating an example of an entire system configuration of a sensor system according to an embodiment of the present invention. The sensor system according to the present embodiment includes n sensors 11-1 to 11-n, a center apparatus 13, and an output unit 14. The sensors 11-1 to 11-n are allocated along a route of an object and detect identification data of the object to output the detected identification data and the detected time.

The center apparatus 13 is connected to the sensors 11-1 to 11-n through a network 12 and gathers data output from the sensors 11-1 to 11-n. Further, the center apparatus 13 has a sensor diagnostic function. The output unit 14 outputs a result of the sensor diagnosis by the center apparatus 13.

Vehicle license plate readers or wireless tag readers such as RFID readers are used as the sensors 11-1 to 11-n, but any other sensors may be used as long as being capable of detecting identification data of an object.

Figure 4:
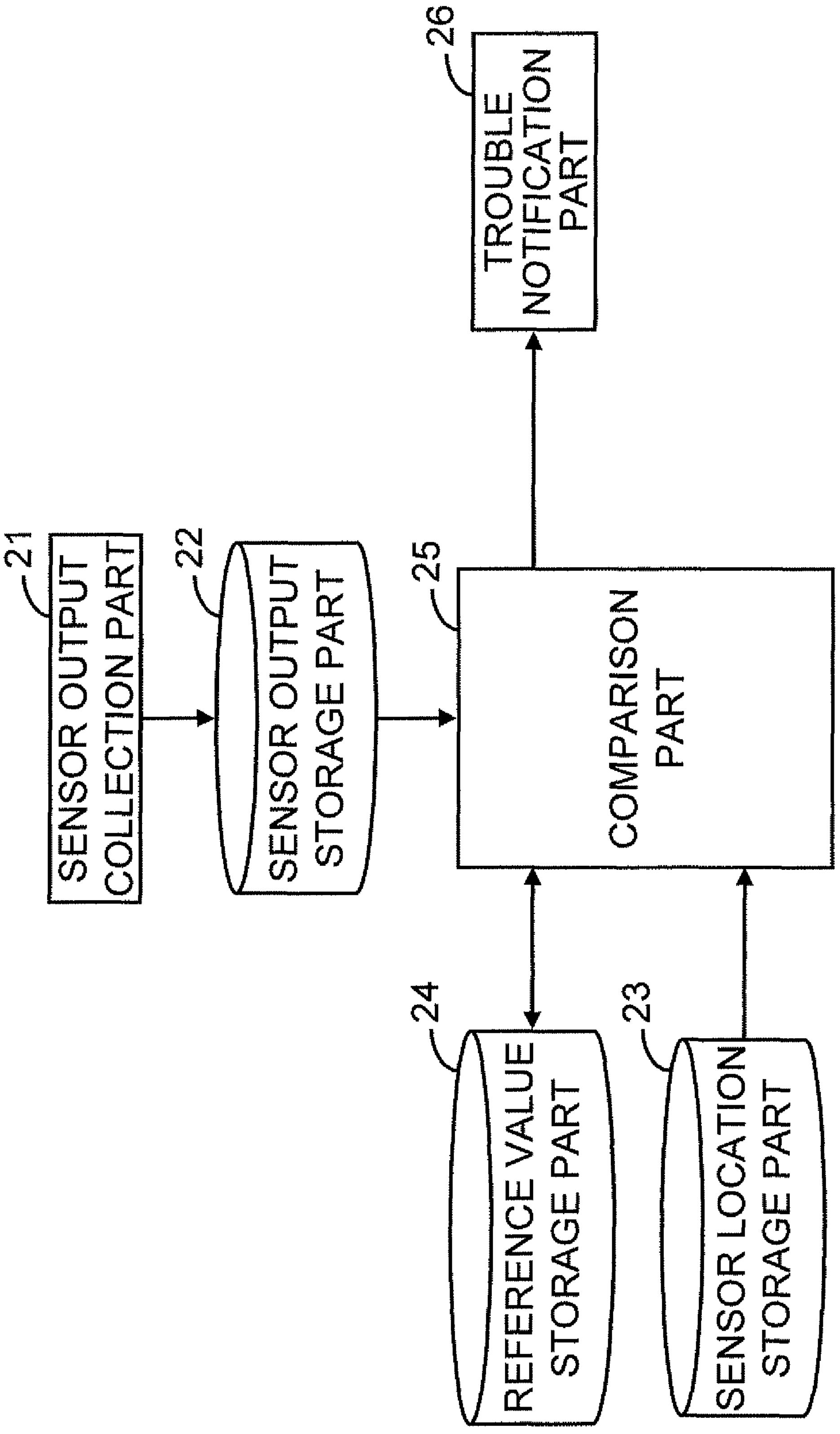
FIG. 4 is a diagram illustrating an example of a function configuration of a sensor diagnostic function provided to a center apparatus according to an embodiment of the present invention.

FIG. 4 is a diagram illustrating an example of a function configuration of a sensor diagnostic function provided to a center apparatus according to an embodiment of the present invention. The sensor diagnostic function according to the present embodiment includes a sensor output collection part 21, a sensor output storage part 22, a sensor location storage part 23, a reference value storage part 24, a comparison part 25, and a trouble notification part 26. The sensor output collection part 21 receives data output from the sensors 11-1 to 11-n and stores a suit of data including an ID (vehicle license number or RFID) of an object read by each sensor and the read time in the sensor output storage part 22 for each sensor ID. FIG. 5 is a diagram illustrating an example of data format of data stored in the sensor output storage part according to an embodiment of the present invention.

Figures 6, 7:
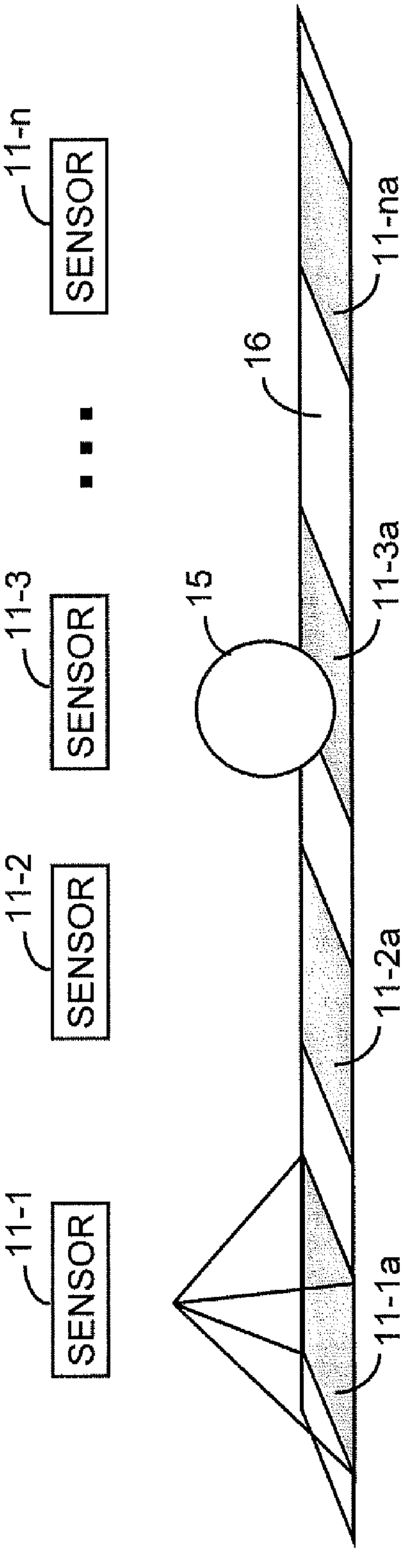
FIG. 6 is a diagram illustrating an example of sensor allocation according to an embodiment of the present invention.
FIG. 7 is a diagram illustrating an example of data format of a sensor location data table stored in a sensor location storage part according to an embodiment of the present invention.

The sensor location storage part 23 stores, in advance, data of positional relationships between the sensors 11-1 to 11-n allocated along the route on which an object moves. FIG. 6 is a diagram illustrating an example of sensor allocation according to an embodiment of the present invention. In the example shown in FIG. 6, the sensors 11-1 to 11-n are allocated along a moving route 16 of an object 15 and have sensing areas 11-1*a* to 11-na, respectively. FIG. 7 is a diagram illustrating an example of data format of a sensor location data table stored in a sensor location storage part according to an embodiment of the present invention. For example, if the sensors 11-1 to 11-n are allocated in line along the moving route 16 of the object 15 (target object) as shown in FIG. 6, IDs of adjacent sensors along the moving route 16 are stored for each sensor to obtain the sensor location data table as shown in FIG. 7.

The sensor 11-1 is allocated at an end of the moving route 16. Thus, “2” representing the sensor 11-2 is stored alone in the field of adjacent sensor ID for the sensor 11-1. In contrast, “1” and “3” representing the sensors 11-1 and 11-3, respectively, are stored in the field of adjacent sensor ID for the sensor 11-2.

The reference value storage part 24 stores, in advance, reference values for a moving pattern of an object. A reference value is defined as the number Sij of objects that move from one sensor location to another during a predefined time period T, for example. FIG. 8 is a diagram illustrating an example of data format of data stored in a reference value storage part according to an embodiment of the present invention. A value of Sij may be set with a counted value that is obtained under such a condition that all sensors normally operate or with an empirically-derived value.

The comparison part 25 reads data from the sensor output storage part 22 at regular time intervals or at a predefined date and time, and diagnoses the sensors 11-1 to 11-n with reference to the data stored in the sensor location storage part 23 and the reference value storage part 24. If a trouble is found in the sensor as a result of the diagnosis, a trouble notification is output from the output unit 14 by way of the trouble notification part 26.

During operation of the system, the sensor output collection part 21 first receives data output from the sensors 11-1 to 11-n and stores, for an ID of each sensor, an ID of an object detected by a pertinent sensor and the read time in the sensor output storage part 22 as shown in FIG. 5.

Then, the comparison part 25 diagnoses each sensor after the data output from the sensors is accumulated for a predefined time period.

Figure 10:
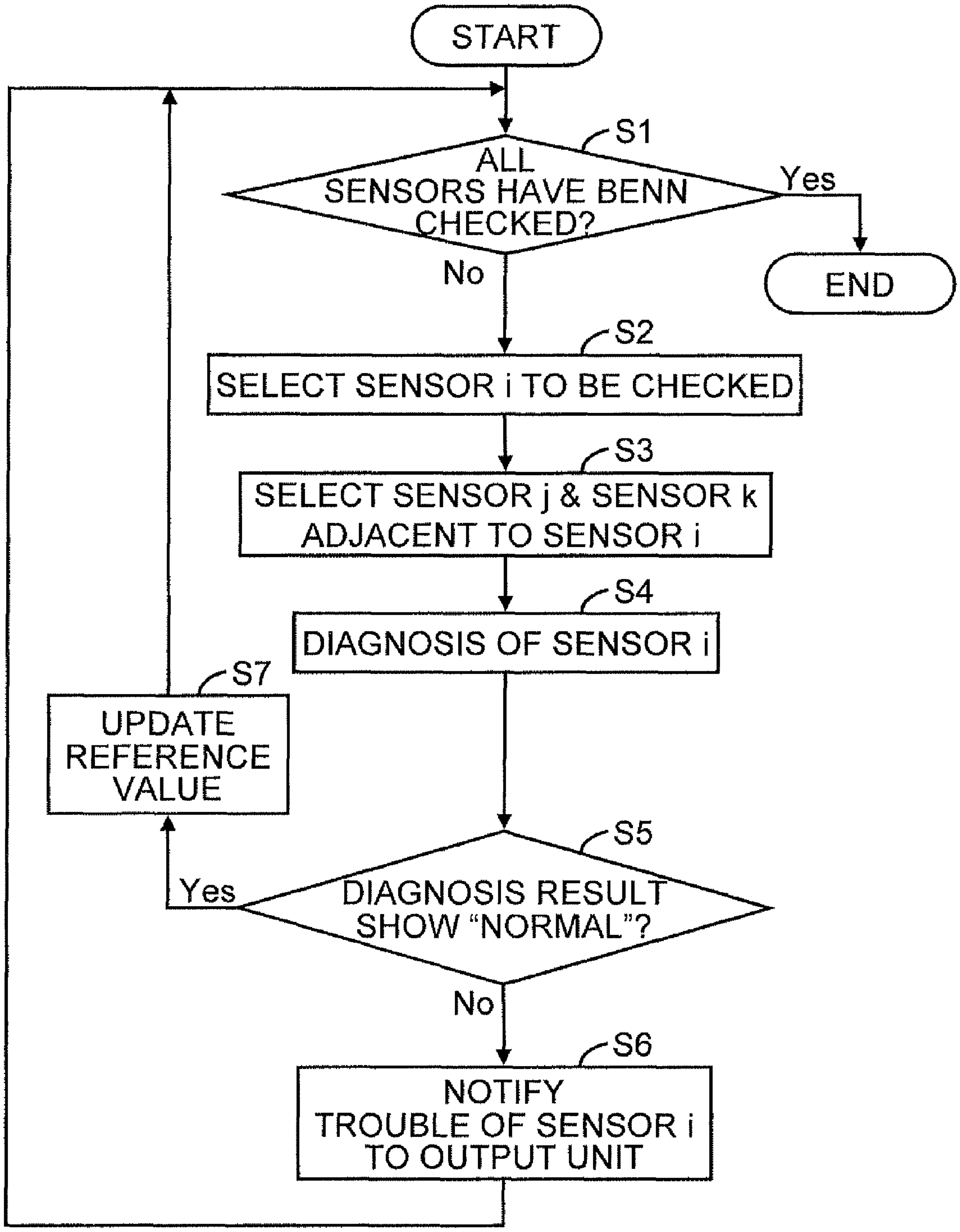
FIG. 10 is a diagram illustrating a flowchart of a sensor diagnostic process executed by a comparison part according to an embodiment of the present invention.

FIG. 10 is a diagram illustrating a flowchart of a sensor diagnostic process executed by a comparison part according to an embodiment of the present invention. A flow of the sensor diagnostic process will be discussed with reference to FIG. 10.

In operation S1, it is determined whether all of the sensors 11-1 to 11-n have been checked.

In operation S2, if any sensor is left to be checked (operation S1: No), a sensor i to be checked is selected.

In operation S3, another two sensors j and k necessary for checking the sensor i are selected. Here, the sensor j is adjacent to the sensor i and the sensor k is adjacent to the sensor i or j.

To elaborate, the two sensors j and k adjacent to the sensor i are selected with reference to the sensor location data table shown in FIG. 7, which is stored in the sensor location storage part 23. If only the sensor j is adjacent to the sensor i, e.g. i=1 and j=2, the sensor k adjacent to the sensor j other than the sensor i, i.e. k=3, is selected.

In operation S4, sensor diagnosis is carried out. First, output data of the sensors i, j, and k for a time period corresponding to a predefined time period T from time T1 to time T2 are read from the sensor output storage part 22. Then, the output data of the sensor i is compared with that of the sensor j to calculate the numbers Tij and Tji of moving objects whose IDs are matched. As a result, a moving object number table shown in FIG. 9 is obtained.

For example, if the sensor 11-1 is in trouble, a deviation of the numbers $T_{12}$, $T_{21}$, $T_{13}$, and $T_{31}$ of moving objects shaded in FIG. 9 from reference values $S_{12}$, $S_{21}$, $S_{13}$, and $S_{31}$ shown in FIG. 8, respectively, is large. Further, if the sensor 11-2 is in trouble, a deviation of the numbers $T_{12}$, $T_{21}$, $T_{23}$, and $T_{32}$ of moving objects from reference values $S_{12}$, $S_{21}$, $S_{23}$, and $S_{32}$ shown in FIG. 8, respectively, is large.

In operation S5, the numbers Tij, Tji, Tik, and Tki of moving objects are compared with reference values Sij, Sji, Sik, and Ski corresponding to the numbers of moving objects, which are stored in the reference value storage part 24 to diagnose the sensor i. If the deviation therebetween reaches a predefined value or more, the sensor i is determined to be in trouble.

In operation S6, if the sensor i is in trouble (operation S5: No), the trouble notification part 26 notifies the output unit 14 of the trouble of the sensor i. Then, the process returns to operation S1 to check a next sensor.

In operation S7, if the sensor i is normal (operation S5: Yes), the reference values Sij, Sji, Sik, and Ski are updated based on Expressions (1) to (4).

$$Sij=\alpha*Tij+(1-\alpha)*Sij \quad (1)$$

$$Sji=\alpha*Tji+(1-\alpha)*Sji \quad (2)$$

$$Sik=\alpha*Tik+(1-\alpha)*Sik \quad (3)$$

$$Ski=\alpha*Tki+(1-\alpha)*Ski \quad (4)$$

Here, α is a fixed value of, for example, about 0.05 to 0.4. After that, the process returns to operation S1 to diagnose a next sensor.

Figure 11:
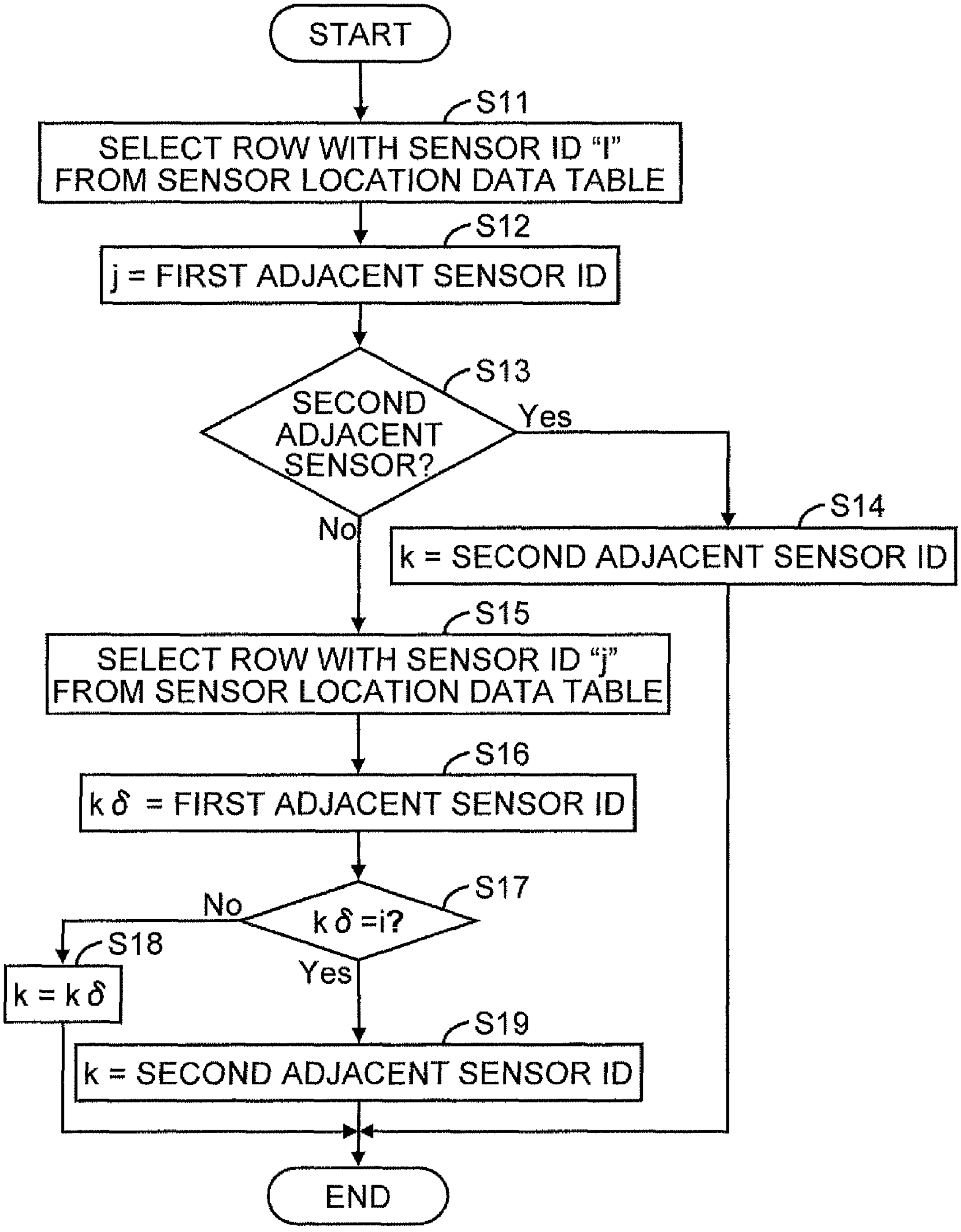
FIG. 11 is a diagram illustrating a flowchart of an adjacent sensor selection process executed by a comparison part according to an embodiment of the present invention.

FIG. 11 is a diagram illustrating a flowchart of an adjacent sensor selection process in operation S3 executed by a comparison part according to an embodiment of the present invention. A flow of the adjacent sensor selection process in operation S3 will be discussed with reference to FIG. 11.

In operation S11, a row with the sensor ID “i” is selected from the sensor location data table.

In operation S12, the value of the parameter j is set with a value of a sensor ID in a first column among adjacent sensor IDs.

In operation S13, it is determined whether a second column among adjacent sensor IDs has a value of a sensor ID.

In operation S14, if a value of a sensor ID is registered in the second column (operation S13: Yes), the value of the parameter k is set with the value of the sensor ID registered in the second column.

In operation S15, If any value of a sensor ID is not registered in the second column (operation S13: No), a row with the sensor ID “j” is selected from the sensor location data table.

In operation S16, a value of a parameter kδ is set with a value of a sensor ID in a first column among adjacent sensor IDs.

In operation S17, it is determined whether the value of the parameter kδ equals to the value of the parameter i.

In operation S18, If the value of the parameter kδ does not equal to the value of the parameter i (operation S17: No), the value of the parameter k is set with the value of the parameter kδ.

In operation S19, if the value of the parameter kδ equals to the value of the parameter i (operation S17: Yes), the value of the parameter k is set with a value of a sensor ID in the second column among adjacent sensor IDs.

Figure 12:
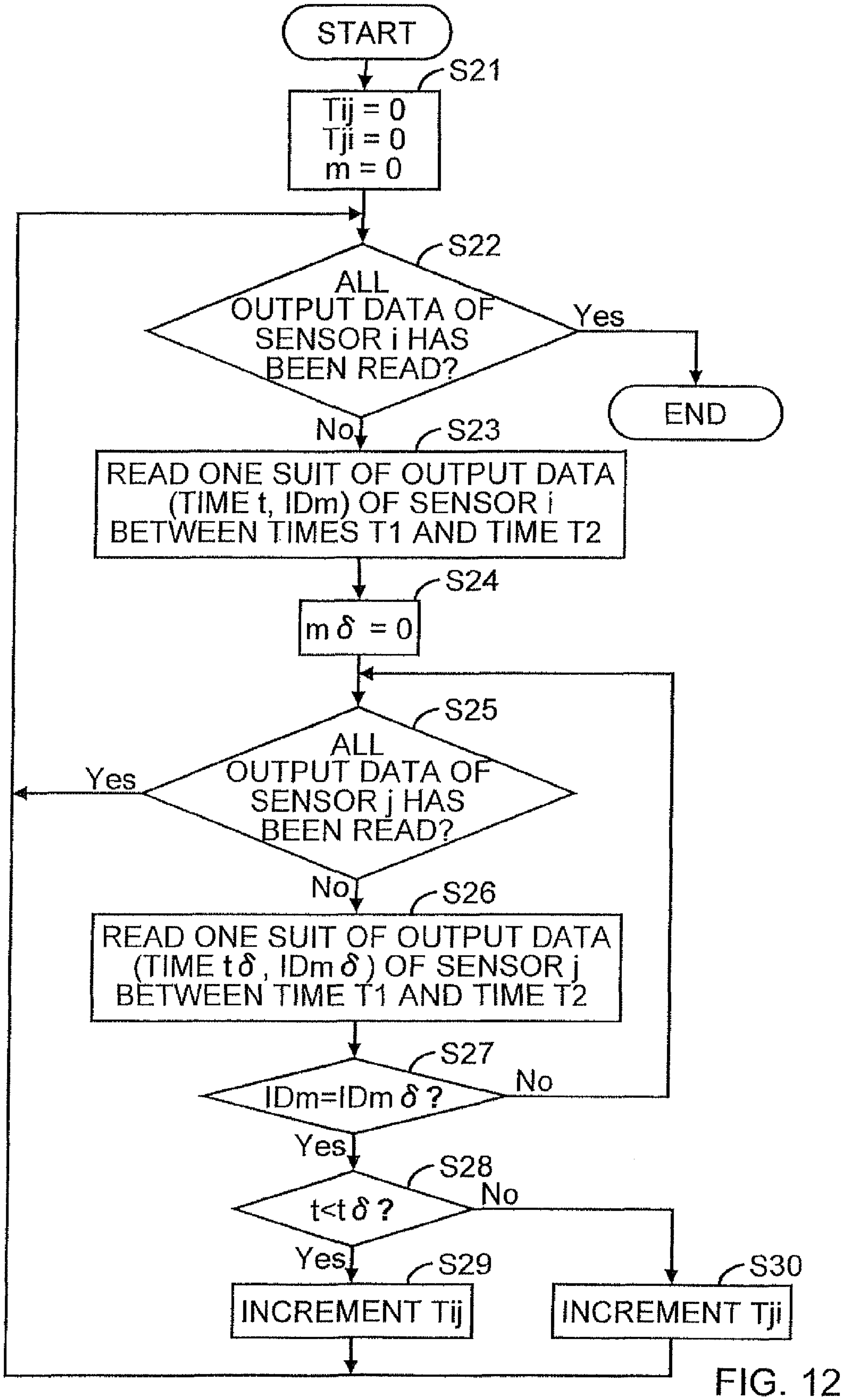
FIG. 12 is a diagram illustrating a flowchart of a moving object count process executed by a comparison part according to an embodiment of the present invention.

FIG. 12 is a diagram illustrating a flowchart of a moving object count process in operation S4 executed by a comparison part according to an embodiment of the present invention. A flow of the moving object count process in operation S4 will be discussed with reference to FIG. 12.

In operation S21, values of Tij and Tji are reset to 0. Moreover, the number m of extracted output data of the sensor i is reset to 0.

In operation S22, it is determined whether all output data of the sensor i has been read from the sensor output storage part 22. If all output data of the sensor i has been read (operation S22: Yes), the process is terminated.

In operation S23, if any output data of the sensor i is left to be read (operation S22: No), one suit of output data (time t, IDm) of the sensor i during a time period from the time T1 to the time T2 is extracted and the value of m is incremented by 1.

In operation S24, the number mδ of extracted output data of the sensor j is reset to 0.

In operation S25, it is determined whether all output data of the sensor j has been read from the sensor output storage part 22. If all output data of the sensor j has been read (operation S25: Yes), the process returns to operation S22.

In operation S26, if any output data of the sensor j is left to be read (operation S25: No), one suit of output data (time tδ, IDmδ) of the sensor j during a time period from the time T1 to the time T2 is extracted and the value of mδ is incremented by 1.

In operation S27, it is determined whether the value of IDm equals to the value of IDmδ. If the value of IDm does not equal to the value of IDmδ, the process returns to operation S25.

In operation S28, if the value of IDm equals to the value of IDmδ, it is determined whether the value of t is less than the value of tδ.

In operation S29, if the value of t is less than the value of tδ (operation S28: Yes), Tij is incremented by 1 and the process returns to operation S22.

In operation S30, if the value of t is more than or equals to the value of tδ (operation S28: No), Tji is incremented by 1 and the process returns to operation S22.

Figure 13:
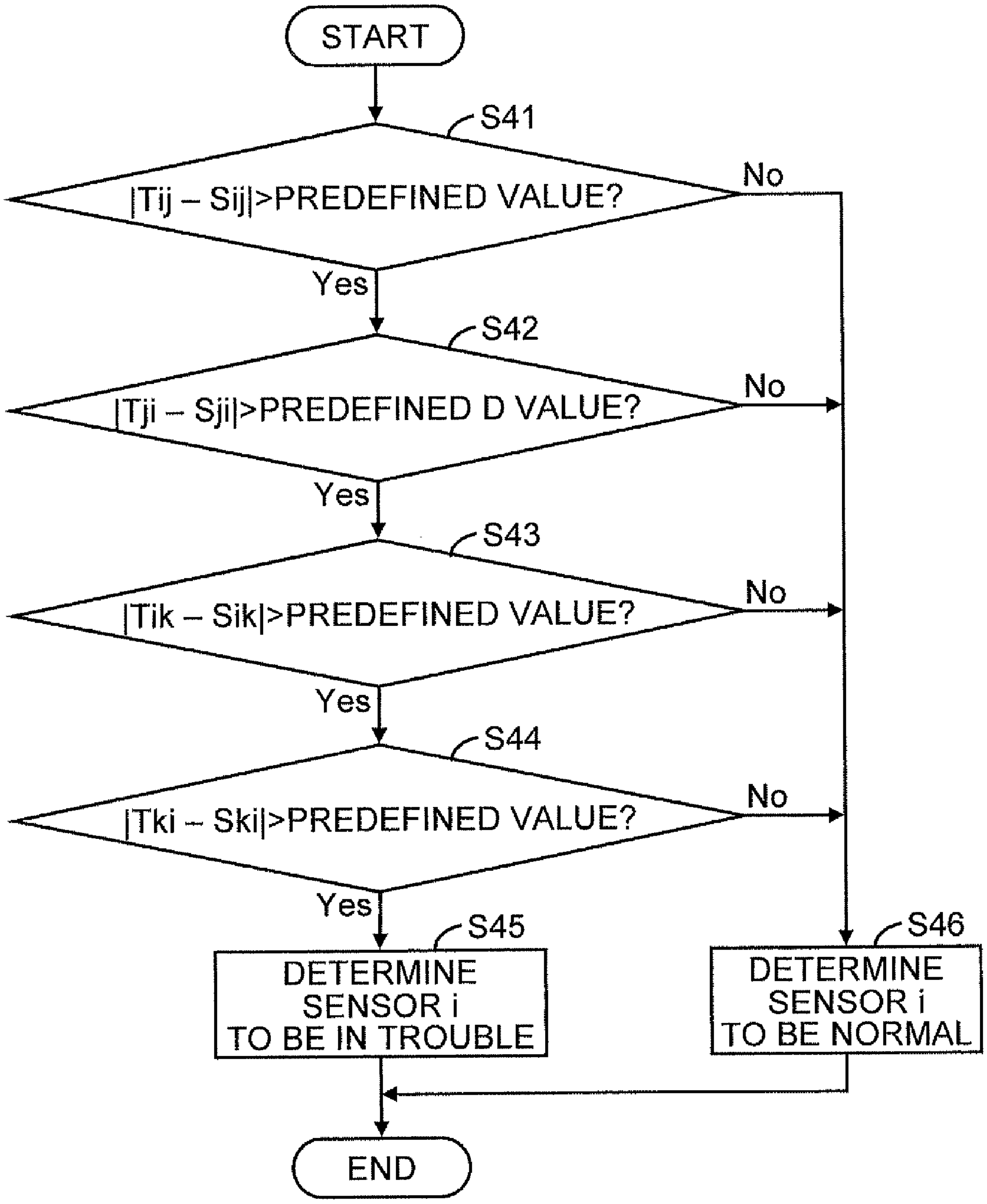
FIG. 13 is a diagram illustrating a flowchart of a determination process executed by a comparison part according to an embodiment of the present invention.

FIG. 13 is a diagram illustrating a flowchart of a determination process in operation S5 executed by a comparison part according to an embodiment of the present invention. A flow of the determination process in operation S5 will be discussed with reference to FIG. 13.

In operation S41, it is determined whether a deviation, i.e., an absolute value of a difference, between the number Tij of moving objects and the reference value Sij exceeds a predefined value (a first fixed value).

In operation S42, if the deviation between the number Tij of moving objects and the reference value Sij exceeds the first fixed value (operation S41: Yes), it is determined whether a deviation between the number Tji of moving objects and the reference value Sji exceeds the first fixed value.

In operation S43, if the deviation between the number Tji of moving objects and the reference value Sji exceeds the first fixed value(operation S42: Yes), it is determined whether a deviation between the number Tik of moving objects and the reference value Sik exceeds the first fixed value.

In operation S44, if the deviation between the number Tik of moving objects and the reference value Sik exceeds the first fixed value (operation S43: Yes), it is determined whether a deviation between the number Tki of moving objects and the reference value Ski exceeds the first fixed value.

In operation S45, if all conditions in operations S41 to S44 are satisfied, the sensor i is determined to be in trouble.

In operation S46, if any of the conditions in operations S41 to S44 is not satisfied, the sensor i is determined to be normal.

Figure 14:
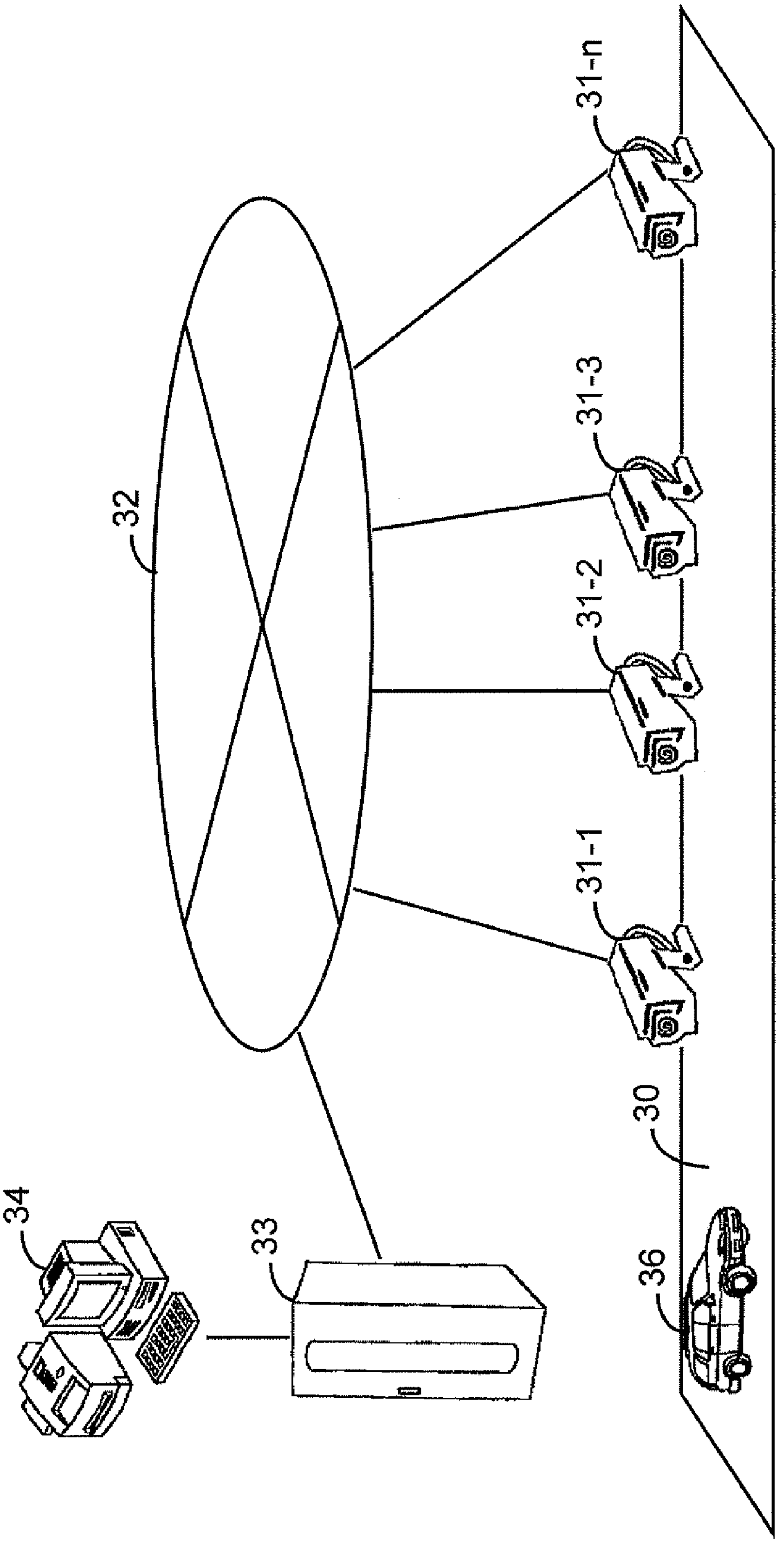
FIG. 14 is a diagram illustrating an example of a travel time calculation system as a sensor system according to an embodiment of the present invention.

FIG. 14 is a diagram illustrating an example of a travel time calculation system as a sensor system according to an embodiment of the present invention. This system calculates an amount of time required to move from one place to another and includes a plurality of sensors (vehicle license plate readers) 31-1 to 31-n allocated along a road 30, a center apparatus 33, and an output unit 34. The center apparatus 33 is connected to the sensors 31-1 to 31-n through a network 32 and gathers number data (read vehicle license number and read time) output from each of the sensors 31-1 to 31-n.

The sensors 31-1 to 31-n are not limited to the vehicle license plate reader but may be any other devices capable of uniquely identifying a target vehicle, more specifically, detecting an identification number of a vehicle 36. For example, a DSRC (dedicated short range communication) device that reads a vehicle identification number by wireless may be used.

In this system, each sensor sends a detected vehicle ID and detected time to the center apparatus 33. The center apparatus 33 retrieves the same ID from output data of the sensors 31-1 to 31-n and estimates an amount of time required to move between locations where the sensors are allocated according to a difference between the detected times.

In this system, the center apparatus 33 diagnoses the sensors 31-1 to 31-n. The function configuration for the diagnosis is as shown in FIG. 4.

The sensor location storage part 23 stores, in advance, data of positional relationships among the sensors 31-1 to 31-n allocated on the road. If the sensors 31-1 to 31-n are allocated as shown in FIG. 14, IDs of adjacent sensors 31-1 to 31-n on the road are stored for each sensor as shown in FIG. 7.

Further, the reference value storage part 24 stores, in advance, reference values for a moving pattern of a vehicle. The reference value is defined as the number Sij of vehicles moving from a location of a sensor i to a location of another sensor j during a predefined time period T. The data is stored in the reference value storage part 24 as shown in FIG. 8. A value of Sij may be set with a counted value that is obtained under such a condition that all sensors normally operate or with an empirically-derived value.

FIG. 15 is a diagram illustrating an example of data format of data stored in a reference value storage part according to an embodiment of the present invention. As shown in FIG. 15, the reference value may be set with a reference value Si_ij whose dimension is identical to a dimension of a ratio of the number Tij of vehicles (moving objects) moving from a location of the sensor i to a location of another sensor j against the total number Ni of vehicles detected by the sensor i during a predefined time period T.

FIGS. 16A and 16B are diagrams illustrating examples of data format of data stored in a reference value storage part according to an embodiment of the present invention. As shown in FIGS. 16A and 16B, a plurality of reference values may be set in accordance with environmental conditions. The environmental conditions differ between the examples shown in FIGS. 16A and 16B. Thus, the reference value Sij shown in FIG. 16A is different from the reference value Tij shown in FIG. 16B (of course, these values may happen to match with each other).

FIGS. 17 and 18 are diagrams illustrating examples of environmental conditions according to an embodiment of the present invention. As for the environmental condition, a time zone may be employed as shown in FIG. 17, or various conditions may be employed as long as the conditions are quantifiable, e.g., a weather condition as shown in FIG. 18. According to the examples shown in FIG. 17, reference values shown in FIG. 16A are used during a time period from 8:00 to 17:00 and reference values shown in FIG. 16B are used during a time period from 17:00 to 8:00. According to the examples shown in FIG. 18, reference values shown in FIG. 16A are used in such an environment that the precipitation reaches 5 mm or more, and reference values shown in FIG. 16B are used in such an environment that the precipitation is less than 5 mm.

During operation of the sensor diagnostic system, the sensor output collection part 21 receives output data of the sensors 31-1 to 31-n and stores, for each sensor ID, vehicle IDs read by the sensor and read time in the sensor output storage part 22 as shown in FIG. 5. The sensor diagnostic function is started after output data of the sensors is accumulated during a predefined time period T.

The sensor diagnosis is carried out by the comparison part 25 through the process shown in FIG. 10. First, a sensor i to be checked is determined and another two sensors j and k necessary for checking the sensor i are selected. The sensors j and k are selected through the selection process shown in FIG. 11. The comparison part 25 references the sensor location data table shown in FIG. 7 stored in the sensor location storage part 23 to select the two sensors j and k adjacent to the sensor i. If the sensor j is only adjacent to the sensor i, the sensor k adjacent to the sensor j other than the sensor i is selected.

The comparison part 25 reads, from the sensor output storage part 22, data output from the thus-selected sensors i, j, and k during a time period from time T1 to time T2 corresponding to a predefined time period T. Then, the output data of the sensor i is compared with that of the sensor j through the moving object count process shown in FIG. 12 to calculate the numbers Tij and Tji of moving objects whose IDs are matched. Likewise, the output data of the sensor i is compared with that of the sensor k through the moving object count process shown in FIG. 12 to calculate the numbers Tik and Tki of moving objects whose IDs are matched.

Moreover, the comparison part 25 compares the numbers Tij, Tji, Tik, and Tki of moving objects with the reference values Sij, Sji, Sik, and Ski stored in the reference value storage part 24, respectively, through the determination process shown in FIG. 13. If each deviation therebetween exceeds a predefined value, the sensor i is determined to be in trouble.

Figure 19:
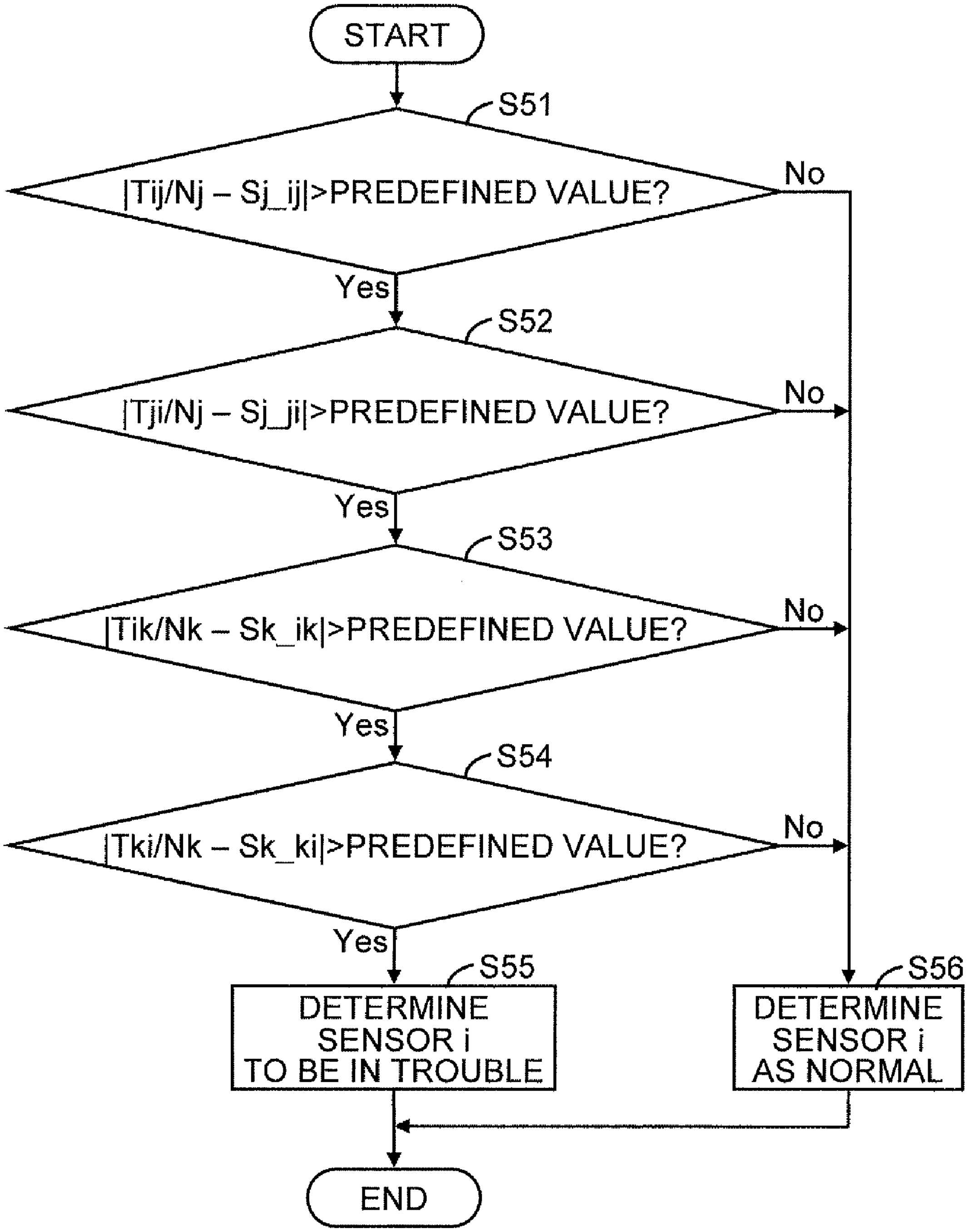
FIG. 19 is a diagram illustrating a flowchart of a determination process executed by a comparison part according to an embodiment of the present invention.

FIG. 19 is a diagram illustrating a flowchart of a determination process executed by a comparison part according to an embodiment of the present invention. If the reference value Si_ij shown in FIG. 15 is stored in the reference value storage part 24, the determination process shown in FIG. 19 is performed in place of the determination process shown in FIG. 13. A flow of the determination process will be discussed with reference to FIG. 19.

In operation S51, it is determined whether a deviation, i.e., an absolute value of a difference, between a ratio Tij/Nj of the number Tij against the number Nj and the reference value Sj_ij exceeds a predefined value (a second fixed value). Here, the number Tij is defined as the number of vehicles moving from a location of the sensor i to a location of another sensor j during the predefined time period T. The number Nj is defined as the total number of vehicles detected by the sensor j during the predefined time period T. The dimension of the reference value Sj_ij is identical to the dimension of the ratio Tij/Nj.

In operation S52, if the deviation between the ratio Tij/Nj and the reference value Sj_ij exceeds the second fixed value (operation S51: Yes), it is determined whether a deviation between a ratio Tji/Nj and the reference value Sj_ji exceeds the second fixed value. Here, the number Tji is defined as the number of vehicles moving from a location of the sensor j to a location of another sensor i during the predefined time period T.

In operation S53, if the deviation between the ratio Tji/Nj and the reference value Sj_ji exceeds the second fixed value (operation S52: Yes), it is determined whether a deviation between a ratio Tik/Nk and the reference value Sk_ik exceeds the second fixed value. Here, the number Tik is defined as the number of vehicles moving from a location of the sensor i to a location of another sensor k during the predefined time period T. The number Nk is defined as the total number of vehicles detected by the sensor k during the predefined time period T.

In operation S54, if the deviation between the ratio Tik/Nk and the reference value Sk_ik exceeds the second fixed value (operation S53: Yes), it is determined whether a deviation between a ratio Tki/Nk and the reference value Sk_ki exceeds the second fixed value. Here, the number Tki is defined as the number of vehicles moving from a location of the sensor k to a location of another sensor i during the predefined time period T.

In operation S55, if all conditions in operations S51 to S54 are satisfied, the sensor i is determined to be in trouble.

In operation S56, if any of the conditions in operations S51 to S54 is not satisfied, the sensor i is determined to be normal.

If a plurality of reference values are set in accordance with various environmental conditions, the comparison part 25 may use reference values corresponding to an environmental condition for current determination process.

According to the above described embodiments, it is possible to determine whether each sensor operates normally without providing a self-diagnostic function to each sensor. Thus, even in a sensor system using an inexpensive sensor having no self-diagnostic function or using an existing sensor, a sensor in trouble may be automatically detected, so a high-reliability system may be configured at a low cost.

What is claimed is:

1. A sensor diagnostic apparatus for diagnosing a sensor among a plurality of sensors, each of said plurality of sensors identifying an object and outputting acquired identification data of the identified object, said sensor diagnostic apparatus comprising:

a moving object counter counting, in accordance with identification data acquired by the plurality of sensors in a predefined time period,
- a first local number of moving objects of which the identification data are acquired by a first sensor and a second sensor near the first sensor, and
- a second local number of moving objects of which the identification data are acquired by the first sensor and a third sensor near the first sensor, the first, second and third sensors being stationary;

a reference value storage storing
- a first preset reference value for the first sensor and the second sensor; and
- a second preset reference value for the first sensor and the third sensor; and a comparator comparing
- a first value derived from the first local number to the first preset reference value, and
- a second value derived from the second local number to the second preset reference value, to determine that the first sensor is in error when
- a first difference between the first value and the first preset reference value exceeds a first predefined threshold value, and
- a second difference between the second value and the second preset reference value exceeds a second predefined threshold value.

2. The sensor diagnostic apparatus of claim 1, wherein each of said plurality of sensors outputs, as well as the identification data, data of an acquired time of the identification data, and said moving object counter counts the first local number of moving objects of which the identification data were acquired by the first sensor and the second sensor and the acquired times of the identification data indicate times within the predefined time period.

3. The sensor diagnostic apparatus of claim 2, wherein said comparator compares the first local number of moving objects, a to the first preset reference value.

4. The sensor diagnostic apparatus of claim 2, wherein said comparator compares a ratio to the first preset reference value, wherein said ratio is the ratio of the first local number of moving objects to the total number of moving objects identified by the first sensor.

5. The sensor diagnostic apparatus of claim 1, wherein said reference value storage stores a plurality of first preset reference values corresponding to different environmental conditions, and said comparator compares the first value derived from the first local number of moving objects to a first preset reference value selected, in accordance with a current environmental condition, from among the plurality of first preset reference values stored in the reference value storage.

6. The sensor diagnostic apparatus of claim 1, wherein said comparator determines the first sensor to be normal when the first difference is less than or equal to the first predefined threshold value, said sensor diagnostic apparatus further comprises:

an updater updating the first preset reference value in accordance with the first local number of moving objects when the comparator has determined the first sensor to be normal.

7. A sensor diagnostic method executed by a sensor diagnostic apparatus for diagnosing a sensor among a plurality of sensors, each of said plurality of sensors identifying an object and outputting acquired identification data, said sensor diagnostic method comprising:

counting, in accordance with identification data acquired by the plurality of sensors in a predefined time period, a first local number of moving objects of which the identification data are acquired by a first sensor and a second sensor near the first sensor, and a second local number of moving objects of which the identification data are acquired by the first sensor and a third sensor near the first sensor, the first, second and third sensors being stationary;

storing a first preset reference value for the first sensor and the second sensor;

storing a second preset reference value for the first sensor and the third sensor; and comparing, by the sensor diagnostic apparatus, a first value derived from the first local number to the first preset reference value, and a second value derived from the second local number to the second preset reference value determining that the first sensor is in error when a first difference between the first value and the first preset reference value exceeds a first predefined threshold value, and a second difference between the second value and the second preset reference value exceeds a second predefined threshold value.

8. The sensor diagnostic method of claim 7, wherein each of said plurality of sensors outputs, as well as the identification data, data of an acquired time of the identification data, and the sensor diagnostic apparatus counts, in said operation of counting the first local number of moving objects, the first local number of moving objects of which the identification data were acquired by the first sensor and the second sensor and the acquired times of the identification data indicate times within the predefined time period.

9. The sensor diagnostic method of claim 8, wherein the sensor diagnostic apparatus compares the first local number of moving objects to the first preset reference value in said operation of comparing a first value derived from the first local number of moving objects to the first preset reference value.

10. The sensor diagnostic method of claim 8, wherein the sensor diagnostic apparatus compares a ratio to the first preset reference value in said operation of comparing a first value derived from the first local number of moving objects to the first preset reference value, wherein said ratio is the ratio of the first local number of moving objects to the total number of moving objects identified by the first sensor.

11. The sensor diagnostic method of claim 7, wherein the sensor diagnostic apparatus stores a plurality of first preset reference values corresponding to different environmental conditions in said operation of storing a first preset reference value, and the sensor diagnostic apparatus compares the first value derived from the first local number of moving objects to a first preset reference value selected, in accordance with a current environmental condition, from among the plurality of first preset reference values in said operation of comparing a first value derived from the first local number of moving objects to the first preset reference value.

12. The sensor diagnostic method of claim 7, wherein the sensor diagnostic apparatus determines the first sensor to be normal when the first difference is less than or equal to the first predefined threshold value in said operation of comparing a first value derived from the first local number of moving objects to the first preset reference value, said sensor diagnostic method further comprising:

updating the first preset reference value in accordance with the first local number of moving objects when the sensor diagnostic apparatus has determined the first sensor to be normal in said operation of comparing a first value derived from the first local number of moving objects to the first preset reference value.

* * * * *

UNITED STATES PATENT AND TRADEMARK OFFICE

CERTIFICATE OF CORRECTION

PATENT NO. : 8,620,613 B2
APPLICATION NO. : 12/338282
DATED : December 31, 2013
INVENTOR(S) : Segawa et al.

It is certified that error appears in the above-identified patent and that said Letters Patent is hereby corrected as shown below:

In the Claim

In Column 11, Line 12, In Claim 3, delete “a to the” and insert -- to the --, therefor.

Signed and Sealed this
Twenty-ninth Day of April, 2014

Michelle K. Lee
*Deputy Director of the United States Patent and Trademark Office*